US012185152B2

(12) United States Patent
Griffin et al.

(10) Patent No.: US 12,185,152 B2
(45) Date of Patent: Dec. 31, 2024

(54) MESH NETWORK RECONFIGURATION FOR SERVICE REINFORCEMENT

(71) Applicant: Red Hat, Inc., Raleigh, NC (US)

(72) Inventors: Leigh Griffin, Waterford (IE); Pierre-Yves Chibon, Paris la Defense (FR)

(73) Assignee: Red Hat, Inc., Raleigh, NC (US)

( * ) Notice: Subject to any disclaimer, the term of this patent is extended or adjusted under 35 U.S.C. 154(b) by 325 days.

(21) Appl. No.: 17/690,873

(22) Filed: Mar. 9, 2022

(65) Prior Publication Data

US 2023/0292171 A1    Sep. 14, 2023

(51) Int. Cl.
*H04W 28/02* (2009.01)
*H04W 24/04* (2009.01)
*H04W 84/18* (2009.01)

(52) U.S. Cl.
CPC ....... *H04W 28/0231* (2013.01); *H04W 24/04* (2013.01); *H04W 84/18* (2013.01)

(58) Field of Classification Search
CPC .......................... H04W 28/0231; H04W 84/18
See application file for complete search history.

(56) References Cited

U.S. PATENT DOCUMENTS

| 10,972,768 | B2  | 4/2021 | Zou et al. |
| 2021/0135983 | A1 | 5/2021 | Farnham |
| 2023/0041780 | A1* | 2/2023 | Lukyanenko ......... H04L 67/143 |

FOREIGN PATENT DOCUMENTS

WO    2011078646 A1    6/2011

OTHER PUBLICATIONS

Zao, et al., "The Industrial Internet of Things Distributed Computing in the Edge", 2020 Industrial Internet Consortium, a program of Object Management Group, Inc., Oct. 18, 2020, 36 pages.

* cited by examiner

*Primary Examiner* — Maharishi V Khirodhar
*Assistant Examiner* — Kenneth P. Hunt
(74) *Attorney, Agent, or Firm* — Womble Bond Dickinson (US) LLP

(57) ABSTRACT

Systems and methods providing mesh network reconfiguration for service reinforcement. In one implementation, a value of a workload metric associated with a first communication device in a first zone of a mesh network is identified. The first communication device is running a first service. Responsive to determining that the value of the workload metric satisfies a defined condition, a second communication device in a second zone of the mesh network is identified. The capacity of the second communication device satisfies a capacity criterion. The first service is started on the second communication device.

20 Claims, 7 Drawing Sheets

MESH NETWORK RECONFIGURATION FOR SERVICE REINFORCEMENT

TECHNICAL FIELD

The present disclosure is generally related to mesh networks, and more particularly, to mesh network reconfiguration for service reinforcement.

BACKGROUND

Multiple devices can be connected through a mesh network. The devices in the mesh network can communicate using defined protocols that enables devices to transmit data within the mesh network. For example, mesh networks can connect individual constituent Internet of Things (IoT) devices. Mesh networks can connect devices in a variety of contexts, such as a home context, a smart city context, or a smart wearables context. Devices within the mesh network can receive requests from devices inside and/or outside of the mesh network. An increase in the number of requests directed to one of the devices within the mesh network can overwhelm the device, and consequently can overwhelm the mesh network itself.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
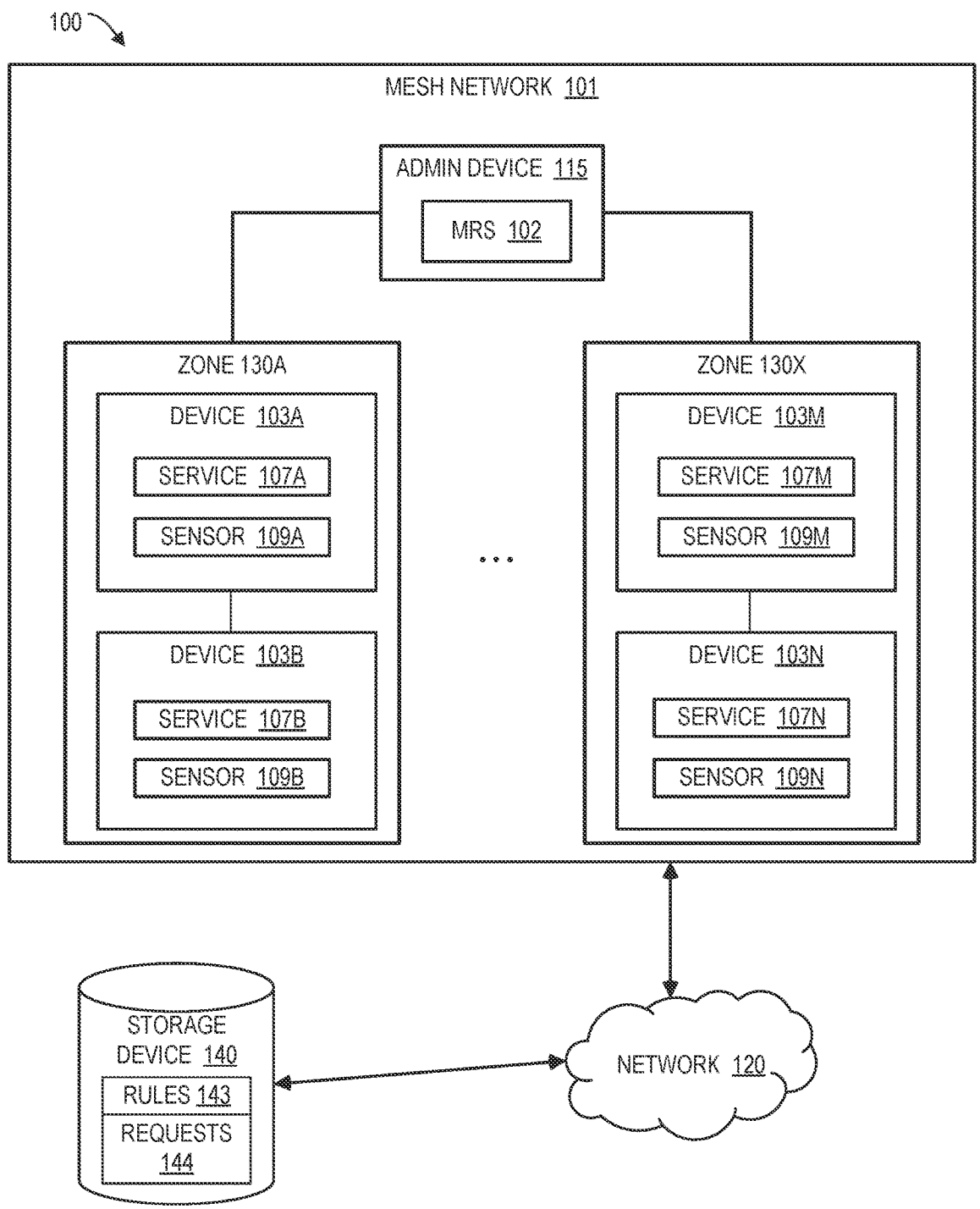
FIG. 1 depicts a block diagram of an example distributed computing system operating in accordance with one or more aspects of the present disclosure.

Implementations of the disclosure are directed to enabling mesh reconfiguration for service reinforcement. A distributed computing system may include a mesh network connecting multiple mobile and/or stationary communication devices. A mesh network management module can monitor communications by the services operating on the communication devices. "Service" refers to one or more applications running on a communication device. Examples of services include notification service, a scheduling service, a reporting service, etc. In embodiments, devices connected to a mesh network can be Internet of Things (IoT) devices, including stationary and mobile devices. Examples of devices connected to a mesh network include smart home devices (e.g., a smart thermostat, smart appliances), wearable devices (e.g., a smart watch, a fitness tracker), and/or nanotech devices attached to a person's body (e.g., a glucose monitor, an implanted defibrillator).

A mesh network is a local network topology in which connected communication devices are directly connected to efficiently route data to and from client devices. A mesh network can be divided into multiple zones, designed to speed up delivery and reduce processing overhead associated with sending information over the mesh network. A zone can be a section of a mesh network such that the amount of traffic between the devices within the section exceeds, by at least a defined factor, the amount of traffic crossing the boundary of the section. Alternatively, a zone can be designated by a geographic area. For example, zones based on geographical areas can include the devices within a certain radius of defined locations. As another example, in a mesh network that includes the devices in a home (e.g., smart thermostat, smart appliances, robot vacuums, etc.), the zones can be based on the rooms in the house, the story in the house (e.g., first floor, second floor, basement), or on some other geographical areas.

A service may need to request data from one or several other services. In some instances, a service may become overloaded with requests, which may in turn overload the communication device on which the service is running. As, the communication devices executing the services within the mesh network have a limited capacity. a high volume of requests directed to communication devices within a zone can create a bottleneck if the zone does not have sufficient hardware resources to fulfill the requests.

Aspects of the present disclosure address the above-noted and other deficiencies by introducing a mesh reconfiguration service (MRS), which can reconfigure the zones within a mesh for service reinforcement. Services executing on communication devices within a mesh network may become overloaded with requests, and in turn may overload the zone to which the communication devices is assigned. To reinforce the services running in an overloaded zone, the MRS can add, to the overloaded zone, one or more communication devices from one or more neighboring zones. The communication devices added to the overloaded zone can execute the services overloaded with requests, thus providing reinforcement for the service.

The MRS can monitor the devices within the mesh network and detect when a device is experiencing a high workload. The MRS can monitor the incoming requests directed to the devices in the multiple zones. The MRS can count the requests received per zone per unit of time (e.g., per 10 seconds). The MRS can determine that a zone is under pressure when the number of requests received for the devices within the zone per unit of time exceeds a defined value.

In embodiments, the MRS can adjust the defined value that determines when a zone is under pressure based on data associated with the devices in the zone and/or the mesh network. For example, the services running on the communication devices in the mesh network can have associated service level agreements that include how many requests per unit of time the devices can (or should) handle. As another example, the MRS can determine that the devices in the zone spend a certain of amount of time fulfilling a request (e.g., 0.1 seconds), and can use that information to determine when the number of requests received per unit of time becomes unmanageable.

For a zone that is under pressure, the MRS can identify a device in the zone that is experiencing a workload violating a defined sustainability condition. The MRS can poll the devices in the zone to determine workload metrics for each device. Workload metrics can reflect, for example, the amount of hardware resources currently being used by the device (e.g., RAM, or CPU processing time), the capacity level of the task queue for the device, and/or the current temperature of the device. The MRS can compare one or all of the workload metrics to corresponding threshold values. Examples of the corresponding threshold values can include, a task queue that is 80% full, a temperature that is above 100 degree fahrenheit, or 85% usage of RAM and/or CPU processing time. If one of workload metrics exceeds the corresponding threshold value, the MRS can determine that that device is experiencing a high workload that violates the defined sustainability condition.

In order to alleviate the pressure of the device experiencing the high workload (i.e., a workload that violates the defined sustainability condition), the MRS can reconfigure the zones to include a device from a neighboring zone in the zone of the device experiencing the high workload. The MRS can select an available device, from a neighboring zone, that is currently experiencing a light workload, or that is currently idle. The MRS can then configure (or reconfigure) the selected device to execute a copy of the service running on the device experiencing the high workload. To select the available device, the MRS can poll the devices in the neighboring zone to identify their workload parameters, including current hardware usage, and/or task queue capacity. The MRS can identify an available device based on the device's workload being below a certain level (e.g., an empty task queue, or no more than 10% usage of hardware resources). In some embodiments, the device can include an indicator of whether it is ready to be reconfigured, or whether it cannot be reconfigured. The indicator can ensure that a device that is critical to the operation of the zone in which it is located does not get reconfigured, even when it is idle.

Prior to reconfiguring a device from a neighboring zone, the MRS can first suspend or shut down the service(s) running on the device to be reconfigured. This avoids having multiple services competing for resources on the reconfigured device. The MRS can reconfigure the mesh to include the reconfigured device from the neighboring zone into the zone with the overloaded device. In embodiments, the MRS can keep track of which zone each device is assigned to, e.g., using a zone identifier in a table storing device information. Additionally or alternatively, each device can maintain a routing table for its zone. The MRS can associate with reconfigured device with the overloaded zone by updating the zone identifier in the MRS device information table and/or the routing table of each device. The MRS can replicate the service(s) running on the device that is experiencing a high workload. For example, the MRS can copy the current configuration of the device experiencing a high workload, and implement the current configuration on the newly reconfigured device. The MRS can start, on the newly reconfigured device, the service(s) running on the device that is experiencing a high workload. Once the MRS has reconfigured the device and started the services on the newly reconfigured device, the requests directed to the device experiencing the high workload can be shared among the two devices.

In embodiments, once the MRS has added the reconfigured device to the overloaded zone, the MRS can implement a failover mechanism to offload, onto the reconfigured device, at least some of the tasks executing on the device experiencing a high workload. The failover mechanism can include duplicating the configuration of the device experiencing the high workload on the reconfigured device.

In embodiments, the MRS can further reconfigure the zones within the mesh to balance the workload and/or devices within each zone of the mesh network. The MRS can reconfigure a third device from a third zone into the neighboring zone from which a device has been reconfigured. For example, the MRS can determine that the neighboring zone from which a device has been reconfigured is under pressure. The MRS can identify, in a third zone, a third device that is idle or experiencing a light workload, and add that third device into the neighboring zone.

In embodiments, the MRS can determine that the workload of the overloaded device no longer violates the defined sustainability condition. That is, the MRS can determine that the workload metrics associated with the device that was experiencing a high workload are no longer above their corresponding thresholds. For example, the MRS can determine that the temperature of the device has fallen below the temperature threshold, that the task queue has fallen below a task queue threshold (e.g., below 50%), and/or that the hardware resource usage has fallen below a certain threshold. Additionally or alternative, the MRS can determine that the number of requests directed to the service running on the two devices has been reduced to a manageable number. As a result, the MRS can return the reconfigured device back to its original zone. The MRS can suspend the service running on the reconfigured device, and can resume the service that was originally running on the reconfigured device.

In some embodiments, the MRS can predict that a zone may experience a high, unsustainable workload request. The MRS can determine that a large number of client devices are connected to (i.e., in communication with) a device within the zone. The number of client devices connected to the device may exceed a threshold value. Even though the device and/or zone may not be under pressure, the MRS can anticipate that the device and/or zone may soon be under pressure based on the number of client devices connected to the device in the zone. As a result, the MRS can preemptively reconfigured a device from a neighboring zone to help cover the anticipated high request volume.

Aspects of the present disclosure present advantages, including but not limited to, enabling a mesh network that can dynamically reconfigure the physical characteristics of the mesh to accommodate various thresholds (e.g., end-user requests, hardware resource usage). Aspects of the present disclosure enable a mesh network that is sustainable even when nodes within the mesh are under a high workload pressure. Aspects of the present disclosure improve the overall functioning of the mesh network by avoiding failures at the node level.

FIG. 1 is a block diagram of a distributed computing system 100, operating in accordance with one or more aspects of the present disclosure. One skilled in the art will appreciate that other architectures are possible, and that the implementation of a computer system utilizing examples of the invention are not necessarily limited to the specific architecture depicted by FIG. 1.

The distributed computing system 100 includes a mesh network 101, and a storage device 140. Mesh network 101 can be a mesh network that includes connected devices 103A-N, and an administrative device 115. Any number of devices 103A-N can be included in mesh network 101. In some embodiments, the administrative device 115 may not be a separate device, but rather may be incorporated into a device 103A-N. Devices 103A-N can include a sensor 109A-N and at least one service 107A-N. Sensor 109A-N can receive requests, e.g., a radio frequency identification (RFID) request. Mesh network 101 can be divided into zones 130A-X. Each zone can include one or more devices 103A-N. A zone can be a section of a mesh network such that the amount of traffic between the devices within the section exceeds, by at least a defined factor, the amount of traffic crossing the boundary of the section. Alternatively, a zone can be designated by a geographic area. For example, zones based on geographical areas can include the devices within a certain radius of defined locations.

Devices 103A-N, and/or admin device 115 can be Internet of Things (IoT) devices, including nanotech devices. Examples of devices 103A-N include can include smart home devices (e.g., a smart thermostat, smart appliances), wearable devices (e.g., a smart watch, a fitness tracker), and/or nanotech devices attached to a person's body (e.g., a glucose monitor, an implanted defibrillator). Devices 103A-N can be, or can incorporate within them, communication devices that can be used to enable the communication and the transfer of data between devices 103A-N, 115.

Storage device 140 may be physical memory and may include volatile memory devices (e.g., random access memory (RAM)), non-volatile memory devices (e.g., flash memory, NVRAM), and/or other types of memory devices. In another example, storage device 140 may include one or more mass storage devices, such as hard drives, solid-state drives (SSD)), other data storage devices, or a combination thereof. In yet another example, storage device 140 may be any virtual memory, logical memory, other portion of memory, or a combination thereof for storing, organizing, or accessing data. In a further example, storage device 140 may include a combination of one or more memory devices, one or more mass storage devices, virtual memory, other data storage devices, or a combination thereof, which may or may not be arranged in a cache hierarchy with multiple levels.

Devices 103A-N, 115 can be connected to storage device 140 via a network 120. Each computing device (e.g., devices 103A-N, 115) can include additional resources not pictured in FIG. 1, such as one or more central processing units (CPU), main memory, which may include volatile memory devices (e.g., random access memory (RAM)), non-volatile memory devices (e.g., flash memory) and/or other types of memory devices, a storage device (e.g., one or more magnetic hard disk drives, a Peripheral Component Interconnect (PCI) solid state drive, a Redundant Array of Independent Disks (RAID) system, a network attached storage (NAS) array, etc.), and one or more devices (e.g., a Peripheral Component Interconnect (PCI) device, network interface controller (NIC), a video card, an input/output device, etc.). In certain implementations, the main memory may be non-uniform access (NUMA), such that memory access time depends on the memory location relative to CPU. The network 120 can be a private network (e.g., a local area network (LAN), a wide area network (WAN), intranet, etc.) or a public network (e.g., the Internet). In one example, the network 120 can include a wired or a wireless infrastructure, which can be provided by one or more wireless communications systems, such as a wireless fidelity (WiFi) hotspot connected with the network and/or a wireless carrier system that can be implemented using various data processing equipment, communication towers, etc. In embodiments, requests can be sent to devices 103A-N, 115 via network 120 using an application programming interface (API), for example.

Administrative device 115 can run a mesh reconfiguration service (MRS) 102. MRS 102 can reconfigure the zones 130A-X in the mesh network 101 to balance the workload of the devices 103A-N, and/or to balance the workload within each zone 130A-X. MRS 102 can monitor the devices 103A-N to detect incoming requests directed to devices 103A-N, e.g., via sensors 109A-N. Additionally or alternatively, MRS 102 can detect the number client devices in communication with devices 103A-N. Once a client device has established a connection with a device 103A-N (e.g., via Bluetooth), the client device can be in communication with a device 103A-N, even if it is not actively sending requests to the device 103A-N. Based on the monitoring of the devices 103A-N, MRS 102 can create and/or update a requests data structure 144 in storage device 140. In embodiments, requests 144 can be a table that stores a list of the devices 103A-N, including the zone assignment for each device 103A-N. The requests 144 data structure can also include a list and/or a count of the client devices in communication with each device 103A-N, a list and/or a count of the requests directed to each device 103A-N, the request type, and/or the time that the request was received. The requests 144 data structure can include additional data.

MRS 102 can use the data in requests 144 to identify a zone that is under pressure, to identify a device 103A-N that is experiencing a high workload, and/or to anticipate that a device 103A-N that may soon receive an increase in number of requests. To identify a zone that is under pressure, MRS 102 can use the data in requests 144 to determine the number of requests directed to devices 103A-N in the corresponding zone, received over a defined time period. MRS 102 can determine that the zone is under pressure if the number of requests exceeds a threshold value.

To determine that a device 103A-N is experiencing a high workload, MRS 102 can determine that the device 103A-N is experiencing a workload that satisfies a defined sustainability condition. MRS 102 can first determine a number of workload metrics associated with the device 103A-N. The workload metrics can reflect, for example, available physical resources, available task queue capacity, and/or the temperature of the device 103A-N. The physical resources can include random access memory (RAM) and/or CPU processing time. MRS 102 can determine one or more of these workload metrics by polling the devices 103A-N, or inspecting the devices 103A-N via an application programming interface (API). MRS 102 can compare the workload metrics to corresponding thresholds, and if one or more of the workload metrics exceeds the corresponding threshold, MRS 102 can determine that corresponding device 103A-N is experiencing a workload that satisfies the defined sustainability condition.

MRS 102 can anticipate that a device 103A-N may soon receive a large number of requests based on the number of client devices in communication with the device 103A-N. MRS 102 can use the data in requests 144 to determine the number of client devices in communication with each device 103A-N. If the number of client devices in communication with each device 103A-N exceeds a threshold value, MRS 102 can anticipate that device 103A-N will receive a large number of requests.

Responsive to identifying a zone that is under pressure, a device 103A-N that is experiencing a high workload, and/or a device 103A-N that may soon receive a large number of requests, MRS 102 reconfigure the zones 130A-X by configuring an available device 103A-N and offloading some of the workload onto the reconfigured device 103A-N. For example, MRS 102 can offload (e.g., redirect) at least a portion of the requests to the reconfigured device 103A-N. MRS 102 can identify a device 103A-N that is underutilized and/or idle to reconfigure. MRS can determine that a device 103A-N is underutilized and/or idle based on, for example, the available resource capacity of the device 103A-N. The configuration (or reconfiguration) of devices 103A-N and the reconfiguration of zones 130A-X in the mesh network 101 is further with respect to FIGS. 2A-B.

MRS 102 can maintain a rules 143 data structure in storage device 140. MRS 102 can use rules 143 to identify or adjust the thresholds for workload metrics, the number of requests, the number of devices in communication with devices 103A-N, and/or the capacity thresholds that indicate that a device 103A-N is underutilized and/or idle. In embodiments, rules 143 can be set by service level agreements associated with the services 107A-N running on devices 103A-N in mesh network 101. For example, the service level agreement of a service 107A-N can specify that the service 107A-N can manageably sustain 10 requests of a certain type per second. MRS 102 can set a threshold number of requests per second threshold accordingly for the device(s) 103A-N running that service 107A-N. Additionally or alternatively, MRS 102 can set and/or adjust the thresholds based on historical data. For example, MRS 102 can determine that a service 107A-N can sustainably manage communication with up to 50 client devices at a time before the service 107A-N experiences high latency, errors, and/or failure. Accordingly, MRS 102 can set the threshold number of client devices in communication with device(s) 103A-N executing that service 107A-N to 50. MRS 102 can adjust the thresholds based on the device type, the service 107A-N running on the device 103A-N, the time of day, the ambient temperature, and/or on other parameters.

Figure 2A:
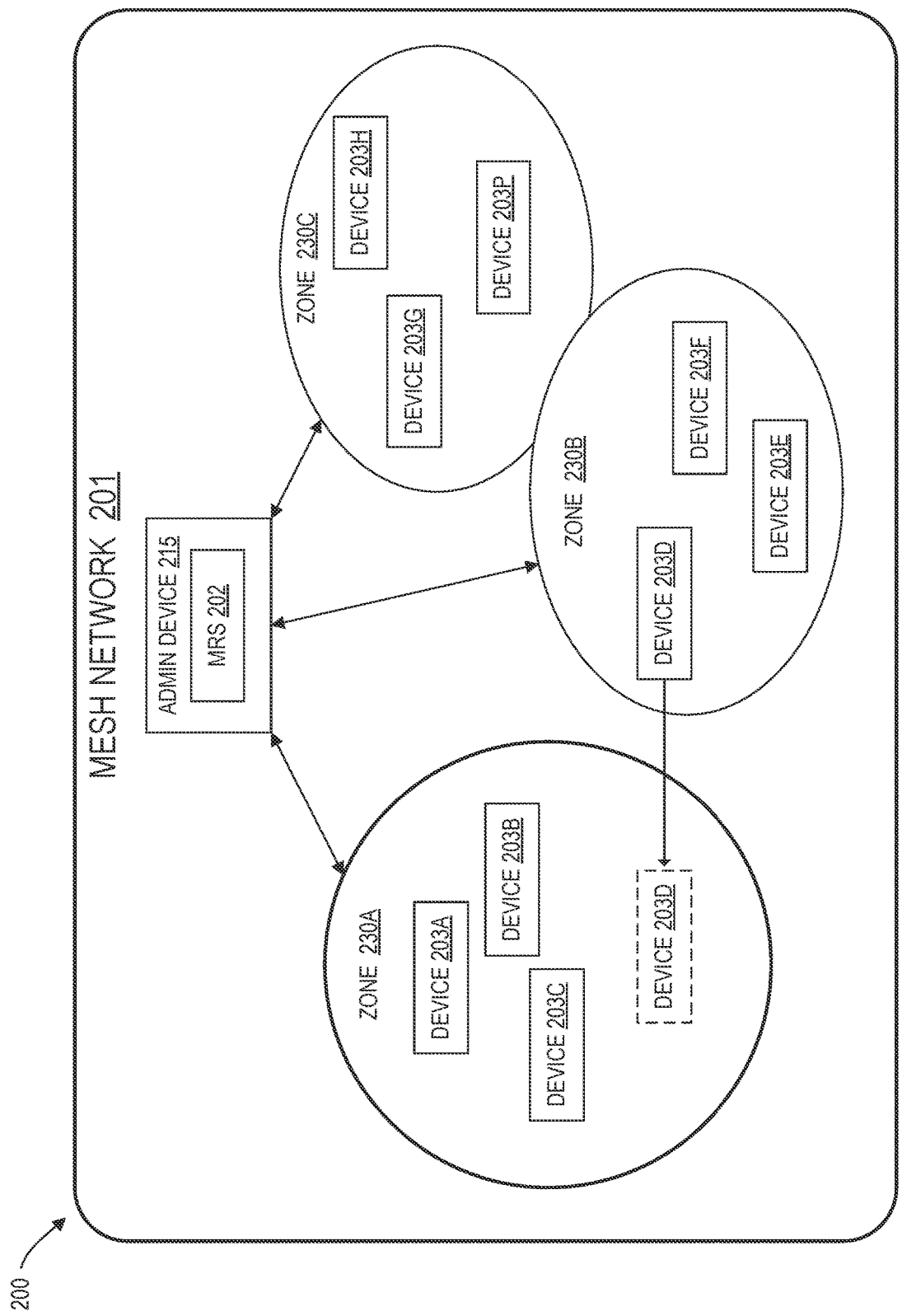
FIGS. 2A-B are block diagrams illustrating reconfiguration of a mesh network, in accordance with one or more aspects of the present disclosure.
Figure 2B:
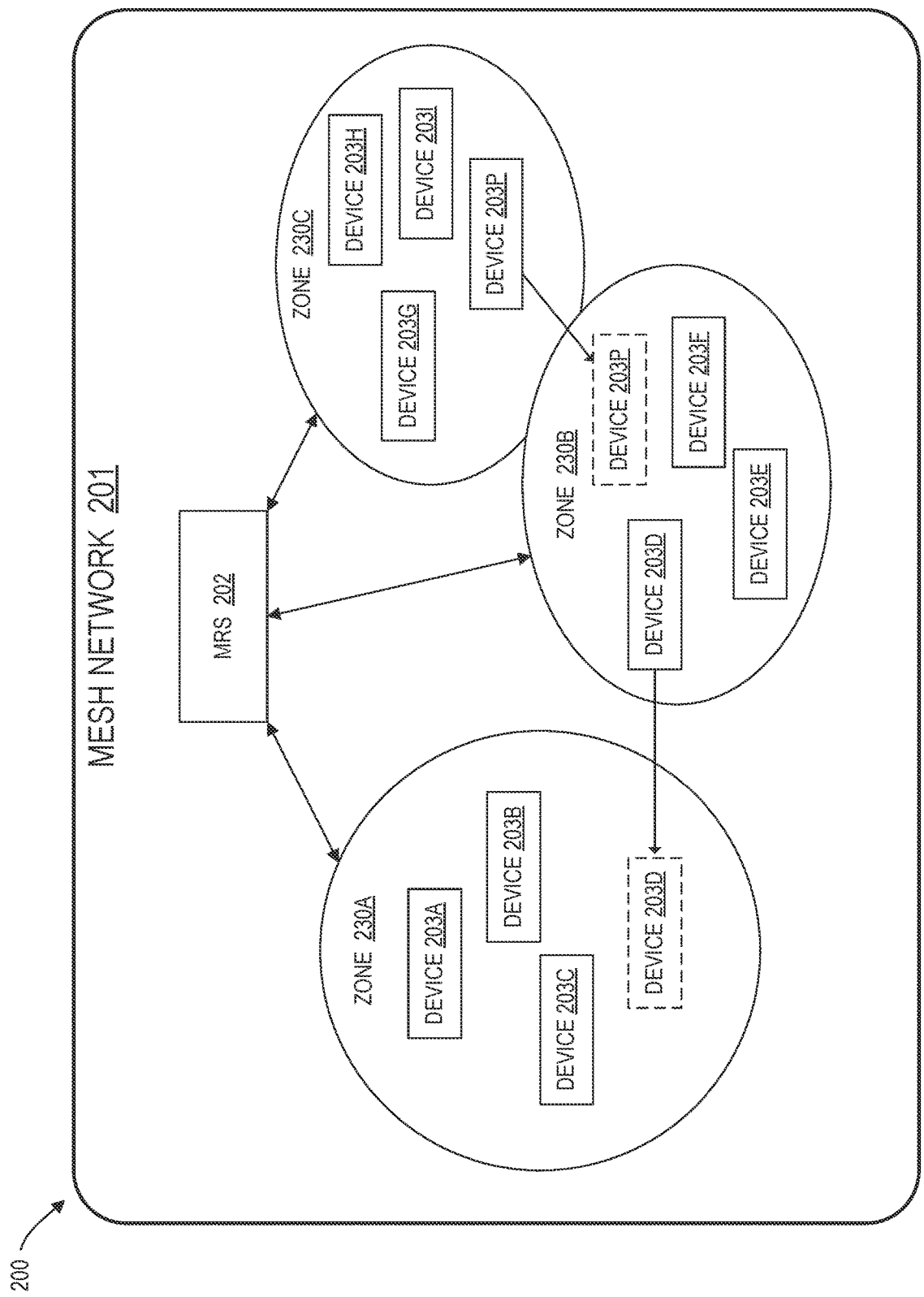

FIGS. 2A-2B are block diagrams illustrating reconfiguration of a mesh network 201, in accordance with one or more aspects of the present disclosure. Mesh network 201 can be a mesh network that includes multiple connected devices 203A-P. The devices 203A-P can be grouped into multiple zones 230A-C. Mesh network 201 can include a mesh reconfiguration service (MRS) 202. In embodiments, MRS 202 can execute on an administrative device 215. In some embodiments, MRS 202 can execute on one of the devices 203A-P. In embodiments, devices 203A-P can perform the same functions as devices 103A-N of FIG. 1; admin device 215 can perform the same functions as admin device 115 of FIG. 1; and mesh network 201 can perform the same functions as mesh network 101 of FIG. 1.

MRS 202 can reconfigure the zones 230A-C by reconfiguring devices 203A-P to balance the workload of the devices 203 A-N, and/or to balance the workload within each zone 230A-C. In MRS 202 can monitor the requests received by devices 203A-P. MRS 202 can create and/or update a data structure to store information about the detected incoming requests. The data structure can be, for example, a table, a list, a linked list, or an array. The data structure can include device 203 A-P identifiers, zone assignments for each device 203A-P, and requests directed to each device 203A-P, including the time the request was received (and/or detected by MRS 202). The data structure can also keep a total count of the number of requests directed to each zone 230A-C, and a count of the number of requests directed to each zone 230A-C per defined time period (e.g., per 10 seconds). The data structure can also maintain a list of the client devices in communication with each device 203A-P. A client device can be in communication with a device 203A-P once it has established a connection, e.g., via Bluetooth. A client device need not actively send a request to a device 203A-P to be considered in communication with the device 203A-P. The data structure can include a total number of client devices in communication with each device 203A-P, and a total number of client devices in communication with each zone 230A-C. Devices 203A-P can each maintain a routing table that includes zone routing information. For example, devices 203A-C can maintain a routing table for zone 230A, devices 203D-F can maintain a routing table for zone 230B, and devices G-P can maintain a routing table for zone 230C.

MRS 202 can use the data in the data structure to determine whether a zone 230A-C is receiving a high number of requests, or to anticipate that a zone 230A-C is expected to receive a high number of requests. To determine whether a zone 230A-C is receiving a high number of requests, MRS 202 can compare the total number of requests directed to each zone 230A-C over a defined time period (as stored in the data structure) to a threshold number. MRS 202 can set the threshold number based on a set of rules. The rules can be stored in a data structure (e.g., storage device 140 of FIG. 1). The rules may correlate to a service level agreements associated with the services running on devices 203A-P. For example, the service level agreements can specify the threshold number of requests that a service can manage per period of time. Additionally or alternatively, MRS 202 can adjust the rules based on observed patterns. For example, MRS 202 can determine that a service running on device 203A takes a certain amount of time to respond to a request (e.g., 0.1 seconds), and can set the threshold number of requests that device 203A can sustain to 10 requests per second. MRS 202 can then determine the number of requests that a zone 230A-C can sustain by combining the threshold number of requests for each device 203A-P in the corresponding zone 230A-C. For example, for zone 230A, MRS 202 can combine the threshold number of requests that the services running on devices 203A-C can sustain per period of time. Additionally or alternatively, the rules can specify the number of requests that each zone 230A-C can sustain.

MRS 202 can then compare the total number of requests directed to a zone 230A-C in a period of time (as stored in the data structure) to the threshold number of requests that the zone 230A-C can sustain (as determined by the rules). If the total number of requests exceeds the threshold number of requests, MRS 202 can determine that the corresponding zone 230A-C is under pressure.

MRS 202 can determine which, if any, of the devices 203A-P in the under pressure zone 230A-C is experiencing a high workload. MRS 202 can determine a workload metric for each device 203A-P in the corresponding zone 230A-C. As an illustrative example, in FIG. 2A, MRS 202 has determined that zone 230A is under pressure (i.e., that the number of requests directed the devices 203A-C in zone 230A exceeds the threshold number sustainable by devices 203A-C and/or zone 230A). MRS 202 can then poll the devices 203A-C in zone 230A to determine one or more workload metrics for each device 203A-C. The workload metrics can include the amount of hardware resources currently being used by the device (e.g., RAM, or CPU processing time), the capacity level of the task queue for the device, and/or the current temperature of the device. MRS 202 can then compare the workload metric(s) to corresponding threshold values to determine whether one (or more) of the devices 203A-C is experiencing a high workload. If any of the workload metric(s) exceeds the corresponding threshold value, MRS 202 can determine that that device 203A-C is overloaded.

To alleviate the pressure on zone 230A and/or on a device 203 A-C in zone 230A, MRS 202 can reconfigure the zones 230A-C by adding a device 230D-P from a neighboring zone 230B-C to zone 230A, reconfiguring the added device 230D-P, and offloading at least a subset of the requests directed to zone 230A and/or devices 203A-C onto the reconfigured device 230D-P. MRS 202 can poll devices 203D-P to identify a device 203D-P that is underutilized and/or idle. In embodiments, MRS 202 can poll one device 203D-P at a time, beginning with the devices 203D-P in the zone physically closest to zone 230A. For example, MRS 202 can begin by polling device 230D in zone 230B to determine whether device 230D is underutilized and/or idle. MRS 202 then poll device 230E in zone 203B, and so on. In some embodiments, MRS 202 can poll all devices 203D-E in the closest zone 230B, or MRS 202 can poll all remaining devices 203D-P. To determine whether a device 203D-P is underutilized, MRS 202 can request hardware resource usage level of the device 203D-P, and/or some other workload indicator (e.g., task queue capacity). If the workload indicator and/or hardware resource usage level fall below a certain level, MRS 202 can determine that the device 203D-P is underutilized and/or idle, and may be a good candidate to add to the under pressure zone (e.g., zone 230A).

In some embodiments, the data structure storing information about the devices 203A-P can include an indicator indicating whether the corresponding device 203A-P may be reconfigured. For example, for safety and/or security reasons, some devices 203A-P should not be reconfigured. Hence, MRS 202 can check the indicator associated with each device 203A-P prior to reconfiguring the device 203A-P.

As an illustrative example, MRS 202 may determine that device 203D is a good candidate to reconfigure and add to zone 230A to alleviate the pressure on zone 230A. That is, MRS 202 may determine that device 203D is underutilized and/or idle. MRS 202 can associate device 230D with zone 230A, and disassociate device 230D from zone 230B. To reconfigure the zones 230A,B, MRS 202 can update the zone assignment for device 230D in the data structure. MRS 202 can also update the routing table for the devices 203A-D in zone 230A, and for the devices 203E-F in zone 230B. In embodiments, prior to reconfiguring device 203D, MRS 202 can suspend, shut down, or otherwise stop the service(s) running on device 203D. MRS 202 can start the service running on an overloaded device 203A-C in zone 230A. In embodiments, MRS 202 can copy the current configuration of the overloaded device 203C and use a failover method to implement the copied configuration on device 203D.

In some embodiments, after the expiration of a defined time period (e.g., after 1 minute has passed since MRS 202 reconfigured device 203D), MRS 202 can determine whether zone 230A and/or the devices 203A-D within zone 230A are under pressure. In some embodiments, MRS 202 can use the data structure to determine the current number of requests received by devices 203A-D in zone 230A per period of time. MRS 202 can compare the current number of requests to the thresholds (e.g., as specified in, or determined by the rules) to determine whether zone 230A is experiencing a high workload. If it is not, MRS 202 can return device 203D to zone 230B. To return device 203D to zone 230B, MRS 202 can stop execution of the service on device 203D, update the data structures to reflect that device 203D is assigned to zone 230B, and resume execution of the service that was originally running on device 203D.

In some embodiments, after the expiration of a defined time period (e.g., after 1 minute has passed since MRS 202 reconfigured device 203D), MRS 202 can determine whether one or all of the devices in zone 230A is under pressure. MRS 202 can poll one or all of the devices 203A-D to determine the current workload metrics for each device 203A-D. MRS 202 can compare the current workload metrics for devices 203A-D to corresponding thresholds to determine whether the devices 203A-D are experiencing a high workload. If the devices 203A-D are no longer experiencing a high workload, MRS 202 can return device 203D to zone 230B. To return device 203D to zone 230B, MRS 202 can stop execution of the service on device 203D, update the data structure to reflect that device 203D is assigned to zone 230B, and resume execution of the service that was originally running on device 203D.

MRS 202 can continually monitor the number of requests received per zone 230A-C and/or the workload metrics for devices 203A-P. At a determined schedule (e.g., every 2 minutes) and/or upon detection of an outlier metric value (e.g., upon detection of an unusually large or small number of requests, such as 80% more or less than the average number of requests; or upon detection of a workload metric that is far above or below above the corresponding thresholds, such as 70% above or below the threshold values), MRS 202 can reconfigure the zones 230A-C to balance the workload throughout mesh network 201 by reconfiguring devices 203A-P, as described above.

In embodiments, MRS 202 can anticipate whether a zone 230A-C may begin to experience a high workload. To anticipate whether a zone 230A-C may being to experience a high workload, MRS 202 can determine the number of client devices are in communication with each zone 230A-C. In embodiments, the number of client devices in communication with devices 203A-P is maintained in the data structure, and MRS 202 can use the data structure to determine the number of client devices in communication with zones 230A-C. A client device can be in communication with a device 203A-P by being connected to the device 203A-P, e.g., via Bluetooth. MRS 202 can detect the presence of a connected client device, and can update the data structure accordingly.

Responsive to determining the number of client devices connected to the devices 203A-P in each zone 230A-C, MRS 202 can compare the number of client devices to a corresponding threshold. In embodiments, the threshold number of client devices can be stored in the rules data structure. If the number of client devices 203A-P in one of the zones 230A-C exceeds the threshold number, MRS 202 can determine that the zone 230A-C may being to receive a high volume of requests from the connected client devices. For example, MRS 202 can determine that the number of client devices connected to zone 230A exceeds the threshold number. As a result, MRS 202 can reconfigure a device 203D-P from a neighboring zone 230B-C, as described above. That is, MRS 202 can identify a device 203D-P in zones 230B-C that is underutilized and/or idle, and can reconfigure that device 203D-P to zone 230A. As illustrated in FIG. 2A, MRS 202 can reconfigure device 230D from zone 230B.

FIG. 2B illustrates MRS 202 balancing the zones 230A-C in mesh network 201. In some embodiments, in response to reconfiguring a device 203D and reconfiguring zone 230A (by adding device 203D) and zone 230B (by removing device 203D), MRS 202 can balance the remaining devices 203E-P in mesh network 201. In embodiments, MRS 202 can determine that after reconfiguring device 203D, zone 230B is under pressure due to a high volume of incoming requests. MRS 202 can identify a device 230P in zone 230C that is underutilized and/or idle, and can offload some of the incoming requests directed to zone 230B by reconfiguring device 230P. MRS 202 can use the same techniques described above to determine the workload metrics of the devices 203E-P in zones 230B-C, to determine whether and which devices 203E-P to reconfigure, and to reconfigure one or more of the devices 230E-P.

In embodiments, MRS 202 can implement a failover mechanism to offload the requests onto the reconfigured device 203D, 203P. The failover mechanism can involve suspending service(s) executing on the reconfigured device 203D,203P. The failover mechanism can retransmit requests directed to overloaded devices within zone 230A-B to the reconfigured devices 203D,203P. The failover mechanism can also automatically offload at least some of the tasks executing on the overloaded devices to the reconfigured devices 203D,203P.

Figure 3:
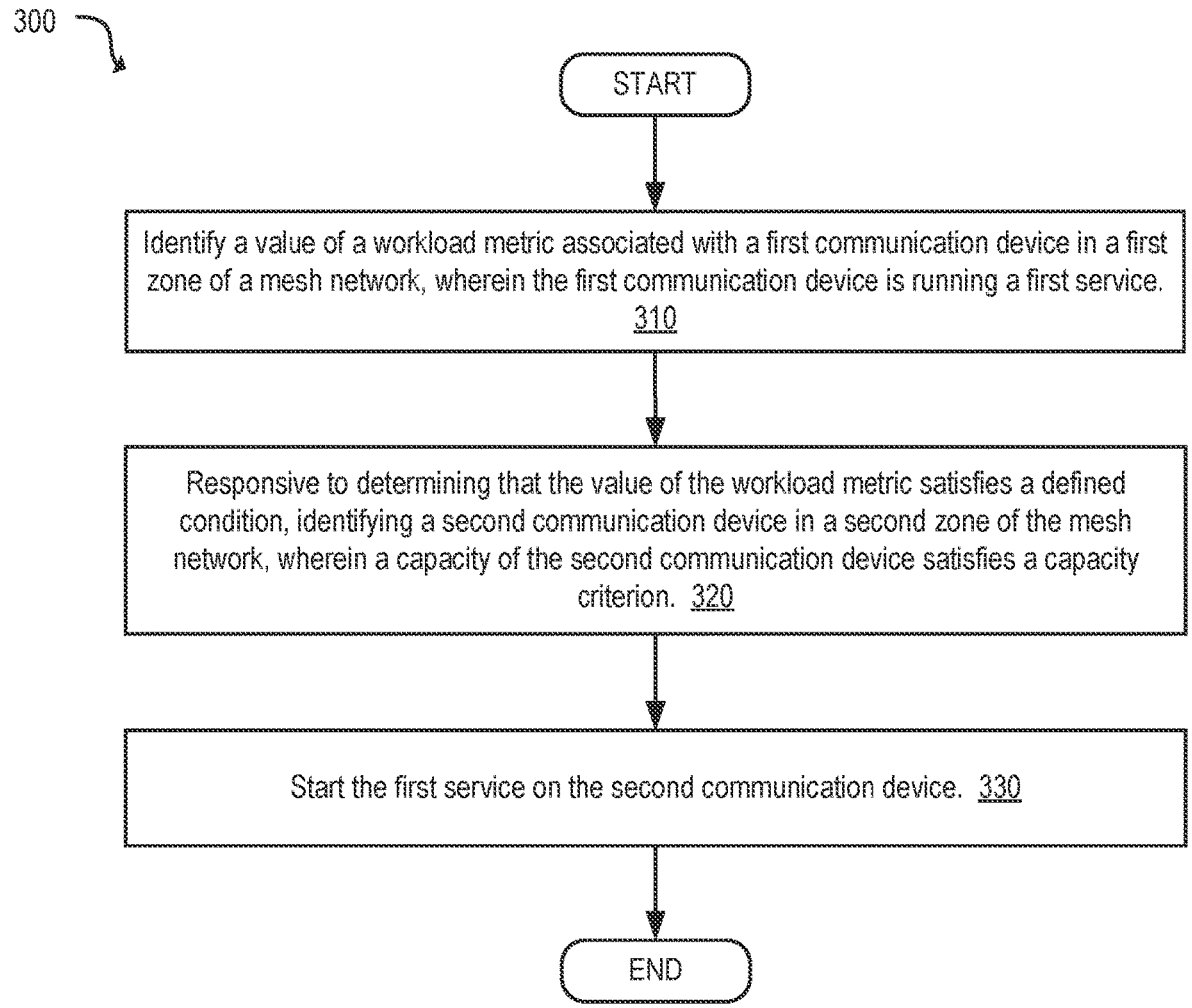
FIG. 3 is a flow diagram of an example method for mesh network reconfiguration, in accordance with one or more aspects of the present disclosure.

FIG. 3 depicts a flow diagram of an example method 300 for a mesh network reconfiguration, in accordance with one or more aspects of the present disclosure. Method 300 may be performed by processing logic (e.g., in admin device 115 of FIG. 1) that may comprise hardware (e.g., circuitry, dedicated logic, programmable logic, microcode, etc.), software (such as instructions run on a processing device), firmware, or a combination thereof. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). In one embodiment, method 300 may be performed by MRS 102 of FIG. 1.

For simplicity of explanation, the methods of this disclosure are depicted and described as a series of acts. However, acts in accordance with this disclosure can occur in various orders and/or concurrently, with other acts not presented and described herein. Furthermore, not all illustrated acts may be needed to implement the methods in accordance with the disclosed subject matter. In addition, it can be appreciated that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

At block 310, processing logic can identify a value of a workload metric associated with a first communication device in a first zone of a mesh network. The first communication device can be running a first service. The first communication device represent a device that is overloaded.

The workload metric associated with the overloaded communication device can represent the workload that the overloaded communication device is experiencing. To identify the value of a workload metric, processing logic can identify at least one of the following values: the task queue capacity of the overloaded communication device, the temperature of the overloaded communication device, and/or the resource availability of the overloaded communication device. The identify any of these metrics, processing logic can inspect or poll the overloaded communication device. For example, processing logic can use an API to request resource availability of the overloaded communication device. The resource availability can include the ratio of free to used RAM and/or CPU processing time, for example. Processing logic can also identify the workload parameters of the communication device by identifying or requesting the usage level of the task queue (i.e., how full the task queue for the overloaded communication device is), and/or the temperature of the overloaded communication device.

In embodiments, the first zone can represent a zone of the mesh network that is under pressure. To identify a first zone is under pressure, processing logic can determine a pressure metric of the first zone. In embodiments, the pressure metric can a compilation of some or all of workload metrics of the devices within the first zone. Additionally or alternatively, the pressure metric can include the number of devices in communication with the devices in the first zone, such that the pressure metric can be associated with the anticipation of a high workload if the number of devices in communication with the devices in the first zone exceeds a threshold. In embodiments, the first zone is identified by determining that a number of requests directed to communication devices within the first zone exceeds a threshold value.

At block 320, responsive to determining that the value of the workload metric satisfies a defined condition, processing logic can identify a second communication device in a second zone of the mesh network. Processing logic can determine that the value of the workload metric satisfies a defined condition by comparing the value of the workload metric to a corresponding threshold. For example, processing logic can compare the identified task queue capacity of the overloaded communication device to a task queue threshold, compare the identified resource availability of the overloaded communication device to a resource availability threshold, and/or can compare the identified temperature of the overloaded communication device to a temperature threshold. Responsive to determining that at least one of the workload metrics exceeds the corresponding threshold, processing logic can determine that the workload metric satisfies the defined condition.

Processing logic can identify a second communication device that has a capacity satisfying a capacity criterion. The second communication device can represent a communication device that is to be reconfigured. To identify a to-be-reconfigured communication device, processing logic can determine one or more resources available on the to-be-reconfigured communication device. The resources can include, for example, the RAM and/or the CPU processing time. Processing logic can determine the availability of the resources by polling or inspecting the to-be-reconfigured communication device, e.g., via an API. The to-be-reconfigured communication device can report the current usage of the resources of the to-be-reconfigured communication device, e.g., including the ratio of free to used resources.

Responsive to determining that the one or more resources available on the to-be-reconfigured communication device are below corresponding thresholds, processing logic can determine that the capacity of the to-be-reconfigured communication device satisfies the capacity criterion. That is, by determining that the available resources are below a corresponding threshold, processing logic can determine that the to-be-reconfigured communication device is underutilized and/or idle, and is a good candidate for being reconfigured. In some embodiments, processing logic can identify an indicator associated with the to-be-reconfigured communication device to determine whether the to-be-reconfigured communication device is available to be reconfigured. For example, a zone may require a minimum of devices (e.g., 2 devices) to operate. Thus, two devices within the zone may have an indicator indicating that they cannot be reconfigured in a mesh reconfiguration and moved to a neighboring zone.

At block 330, processing logic can start the first service on the second communication device. In embodiments, processing logic can suspend a second service running on the second communication device, e.g., to avoid having the second service compete for resources. Starting the first service on the second communication device can include copying the current configuration of the first communication device, transmitting the current configuration to the second communication device, and causing the second communication device to operate in view of the current configuration. Processing logic can associate the second communication device with the first zone of the mesh network. For example, processing logic can update a data structure to indicate that the second communication device is assigned to the first zone.

In some embodiments, processing logic can ensure the availability of the second service in the second zone. In embodiments, processing logic can transmit the service manifest for the second communication device to the second zone, and replicate the second service on a third device within the second zone. For instance, processing logic can identify a third device in the second zone, and can start the second service on the third device. That is, in response to adding the second device to the first zone, processing logic can identify a third device in the second zone. The capacity of the third device can satisfy the capacity criterion, indicating that the third device is underutilized and/or idle. The processing logic can then run the second service on the third device. In some embodiments, processing logic can identify a third device in the second zone that satisfies a different capacity criterion, thus identifying a third device that is not necessarily underutilized and/or idle, but that has some capacity available to sustain the second service.

In embodiments, processing logic can determine that the first device is no longer overloaded. At the expiration of a defined period of time (e.g., after 2 minutes have passed since the second device was reconfigured and added to the first zone), processing logic can determine that the first device is not overloaded by determining that the value of the workload metric does not satisfy the defined condition. That is, processing logic can determine an updated value for the workload metrics, and can compare them to the corresponding thresholds. If the workload metrics no longer exceed the corresponding thresholds, processing logic can determine that the first device is no longer overloaded. In some embodiments, processing logic can determine that the first device is no longer overloaded by determining that the workload metrics are below the corresponding thresholds by a certain amount (by 50%). Processing logic can return the second device back to the second zone. Processing logic can suspend execution of the first service on the second communication device, and resume execution of the second service on the second communication device. Processing logic can also update the data structure to indicate that the second communication device is assigned to the second zone. That is, processing logic can associate the second communication device with the second zone of the mesh network.

Figure 4:
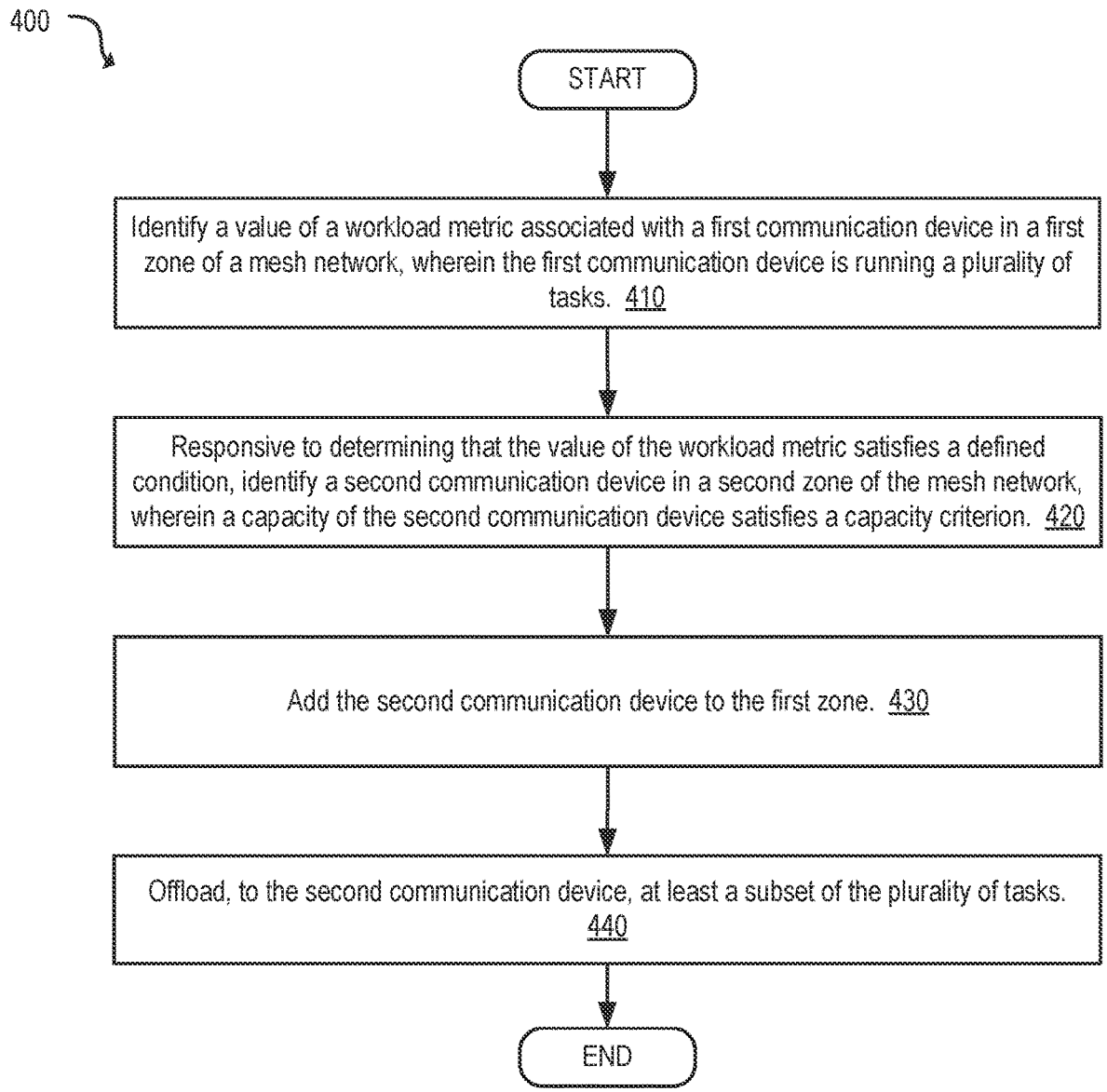
FIG. 4 is a flow diagram of another example method for a mesh network reconfiguration, in accordance with one or more aspects of the present disclosure.

FIG. 4 depicts a flow diagram of another example method 400 for a mesh network reconfiguration, in accordance with one or more aspects of the present disclosure. Method 400 may be performed by processing logic (e.g., in admin device 115 of FIG. 1) that may comprise hardware (e.g., circuitry, dedicated logic, programmable logic, microcode, etc.), software (such as instructions run on a processing device), firmware, or a combination thereof. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). In one embodiment, method 400 may be MRS 102 of FIG. 1.

For simplicity of explanation, the methods of this disclosure are depicted and described as a series of acts. However, acts in accordance with this disclosure can occur in various orders and/or concurrently, with other acts not presented and described herein. Furthermore, not all illustrated acts may be needed to implement the methods in accordance with the disclosed subject matter. In addition, it can be appreciated that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

At block 410, processing logic can identify a value of a workload metric associated with a first communication device in a first zone of a mesh network. The first communication device can be running a plurality of tasks (e.g., to fulfill incoming requests directed to the first communication device). The first communication device represent a device that is overloaded.

In embodiments, the first zone can represent a zone of the mesh network that is under pressure. To identify a first zone is under pressure, processing logic can determine a pressure metric of the first zone. In embodiments, the pressure metric can a compilation of some or all of workload metrics of the devices within the first zone. Additionally or alternatively, the pressure metric can include the number of devices in communication with the devices in the first zone, such that the pressure metric can be associated with the anticipation of a high workload if the number of devices in communication with the devices in the first zone exceeds a threshold. In embodiments, the first zone is identified by determining that a number of requests directed to communication devices within the first zone exceeds a threshold value.

At block 420, responsive to determining that the value of the workload metric satisfies a defined condition, processing logic can identify a second communication device in a second zone of the mesh network. Processing logic can determine that the value of the workload metric satisfies a defined condition by comparing the value of the workload metric to a corresponding threshold. For example, processing logic can compare the identified task queue capacity of the overloaded communication device to a task queue threshold, compare the identified resource availability of the overloaded communication device to a resource availability threshold, and/or can compare the identified temperature of the overloaded communication device to a temperature threshold. Responsive to determining that at least one of the workload metrics exceeds the corresponding threshold, processing logic can determine that the workload metric satisfies the defined condition.

Processing logic can identify a second communication device that has a capacity satisfying a capacity criterion. The second communication device can represent a communication device that is to be reconfigured. To identify a to-be-reconfigured communication device, processing logic can determine one or more resources available on the to-be-reconfigured communication device. The resources can include, for example, the RAM and/or the CPU processing time. Processing logic can determine the availability of the resources by polling or inspecting the to-be-reconfigured communication device, e.g., via an API. The to-be-reconfigured communication device can report the current usage of the resources of the to-be-reconfigured communication device, e.g., including the ratio of free to used resources. Responsive to determining that the one or more resources available on the to-be-reconfigured communication device are below corresponding thresholds, processing logic can determine that the capacity of the to-be-reconfigured communication device satisfies the capacity criterion. That is, by determining that the available resources are below a corresponding threshold, processing logic can determine that the to-be-reconfigured communication device is underutilized and/or idle, and is a good candidate for being reconfigured. In some embodiments, processing logic can identify an indicator associated with the to-be-reconfigured communication device to determine whether the to-be-reconfigured communication device is available for being reconfigured.

At block 430, processing logic can add the second communication device to the first zone, and can remove the second communication device from the second zone. Processing logic can update a zone identifier associated with the second communication device in a data structure, and/or can update the routing tables in the first and second zones to reflect the reconfiguration (i.e., the addition of the second communication device in the first zone, and the removal of the second communication device from the second zone).

At block 440, processing logic can offload, to the second communication device, at least a subset of the plurality of tasks executing on the first communication device. In embodiments, processing logic can suspend execution of one or more services running the second communication device.

In some embodiments, processing logic can balance the workload throughout the mesh network. That is, in response to adding the second communication device to the first zone, the processing logic can determine the workload of the other zone(s) and/or communication device(s) in the mesh network, and determine whether to reconfigure other communication devices to balance the workload between the communication devices and/or zones in the mesh network. in embodiments, processing logic can determine that the second zone satisfies a second, zone-specific defined condition. Satisfying the zone-specific defined condition can include determining that the number of requested directed to the second zone is above a threshold number, and/or that the values of the workload metrics associated with each communication device in the second zone are above corresponding thresholds. That is, processing logic can determine that the second zone is under pressure. The thresholds can be specific to the zone, for example, based on rules determined by the MRS, and/or based on the number of communication devices in the zone. Responsive to determining that the second zone satisfies the second, zone-specific threshold, processing logic identify a third communication device in a third zone. The third communication device can be underutilized and/or idle, and therefore can have a capacity that satisfies the capacity criterion. In order to balance the workload between the zones, processing logic can add the third device to the second zone. Processing logic can offload, to the third communication device, at least a portion of the requests directed to communication devices in the second zone.

Figure 5:
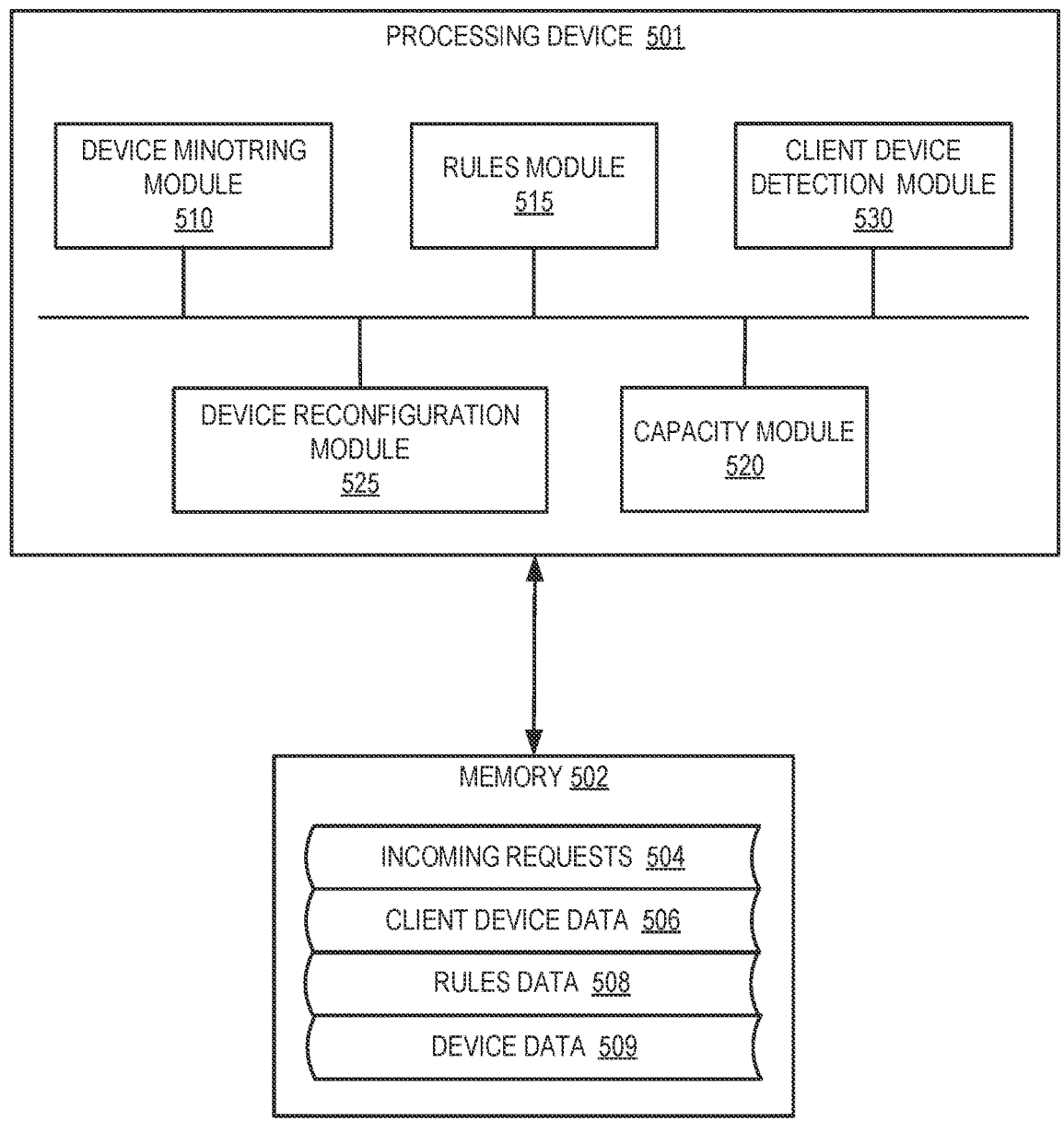
FIG. 5 depicts a block diagram of an example computer system that implements a mesh reconfiguration system, in accordance with one or more aspects of the present disclosure.

FIG. 5 is a block diagram of an example computer system 500 that implements a mesh reconfiguration service operating in accordance with one or more aspects of the present disclosure. Computer system 500 may be the same or similar to administrative device 115 of FIG. 1. Computer system 500 may include a device monitoring module 510, a rules module 515, a capacity module 520, device reconfiguration module 525, and/or a client device detection module 530. Computer system 500 may also include a memory 502 that may store incoming requests 504, client device data 406, rules data 508, and/or device data 509. Incoming requests 504 can be a list representing the incoming requests directed to the devices in the mesh network. Client device data 506 can be a list of client devices in communication with the devices in the mesh network. Rules data 508 can be a list of rules (including threshold values) used to determine whether, when and which devices to reconfigure. Device data 509 can be a list of devices in the mesh network, including zone assignments.

In embodiments, computer system 500 may operate as part of a mesh network connecting multiple devices. The device monitoring module 510 may enable a processor to monitor the devices in the mesh network for incoming requests directed to the devices. The device monitoring module 510 may detect incoming requests, and may create and/or update a data structure of detected incoming requests 504. In embodiments, the incoming requests 504 may be stored in a table. The incoming requests data structure 504 can include an indicator identifying the target device to which the request is directed, and the zone in which the target device resides. The incoming requests data structure 504 can also include, for example, the request type and the time that the request was received. The device monitoring module 510 can determine the number of requests received for a particular zone in the mesh network per unit of time, using the data stored in the incoming requests 504.

The client device detection module 530 may enable a processor to detect client devices connected to, or in communication with, the devices in the mesh network. The client device detection module 530 can create and/or maintain a data structure to store client device data 506. Client device data 506 can be a list of devices in communication with devices in the mesh network.

The rules module 515 may enable a processor to apply rules data 508 to determine whether to reconfigure a device, associate it with one zone and disassociate it from another zone. The rules module 515 can set and/or adjust the thresholds used to determine whether a zone is under pressure, to identify a device that is experience a high workload, and/or to identify a device that can be reconfigured. In embodiments, rules data 508 can be based on service level agreements associated with the services running on the devices in the mesh network. In embodiments, rules module 515 can set and/or adjust the thresholds in rules 508 based on historical data, device type, time of day, or based on another parameter. Rules 508 can store capacity threshold values, workload metrics threshold values, number of requests received per time period threshold values, and/or threshold number of client devices in communication with a device.

The capacity module 520 may enable a processor to determine the available capacity of a device in the mesh network. Capacity module 520 may enable a processor to poll the devices in the mesh and/or to inspect the devices in the mesh to determine the hardware resource availability or usage level of the device (e.g., the RAM usage level, the CPU processing time usage level).

The device reconfiguration module 525 may enable a processor to reconfigure devices, and associate and/or disassociate reconfigured devices from zones in the mesh network. Device reconfiguration module 525 may compare the number of requests received per zone, the number of client devices in communication with the a device, and/or the workload metrics of a device to the corresponding threshold values in rules 508 to determine whether to reconfigure a device. To identify a device to reconfigure, device reconfiguration module 525 can compare the capacity of a device (as determined by capacity module 520) to the capacity threshold from rules 508 to identify an underutilized and/or idle device. Device reconfiguration module 525 can suspend the service(s) running on the reconfigured device, and execute, on the reconfigured device, a copy of the service(s) running on the overloaded device. The device reconfiguration module 525 can associate the reconfigured device with zone associated with the overloaded device, e.g., by updating the zone assignment of the reconfigured device in device data 509. The device reconfiguration module 525 can disassociate the reconfigured device from its original zone.

In some embodiments, device reconfiguration module 525 may enable a processor to return a device back to its original zone if the overloaded device is no longer overloaded, or if the under pressure zone is no longer under pressure. For example, after an expiration of a time period, device reconfiguration module 525 may compare the workload metrics of the overloaded device to the thresholds from rule 508 to determine if it is still overloaded. If it is not, device reconfiguration module 525 may return the reconfigured device back to its original zone by updating the zone assignment in device data 509, suspending execution of the service on the device, and resuming the service previously running on the device. In embodiments, to determine that a device is no longer overloaded, device reconfiguration module 525 may use different threshold values than were used to determine that the device was overloaded. For example, device reconfiguration module 525 can determine that a device is overloaded if the task queue is 80% full. However, device reconfiguration module 525 may wait until the task queue is 50% full before determining that the device is no longer overloaded.

Figure 6:
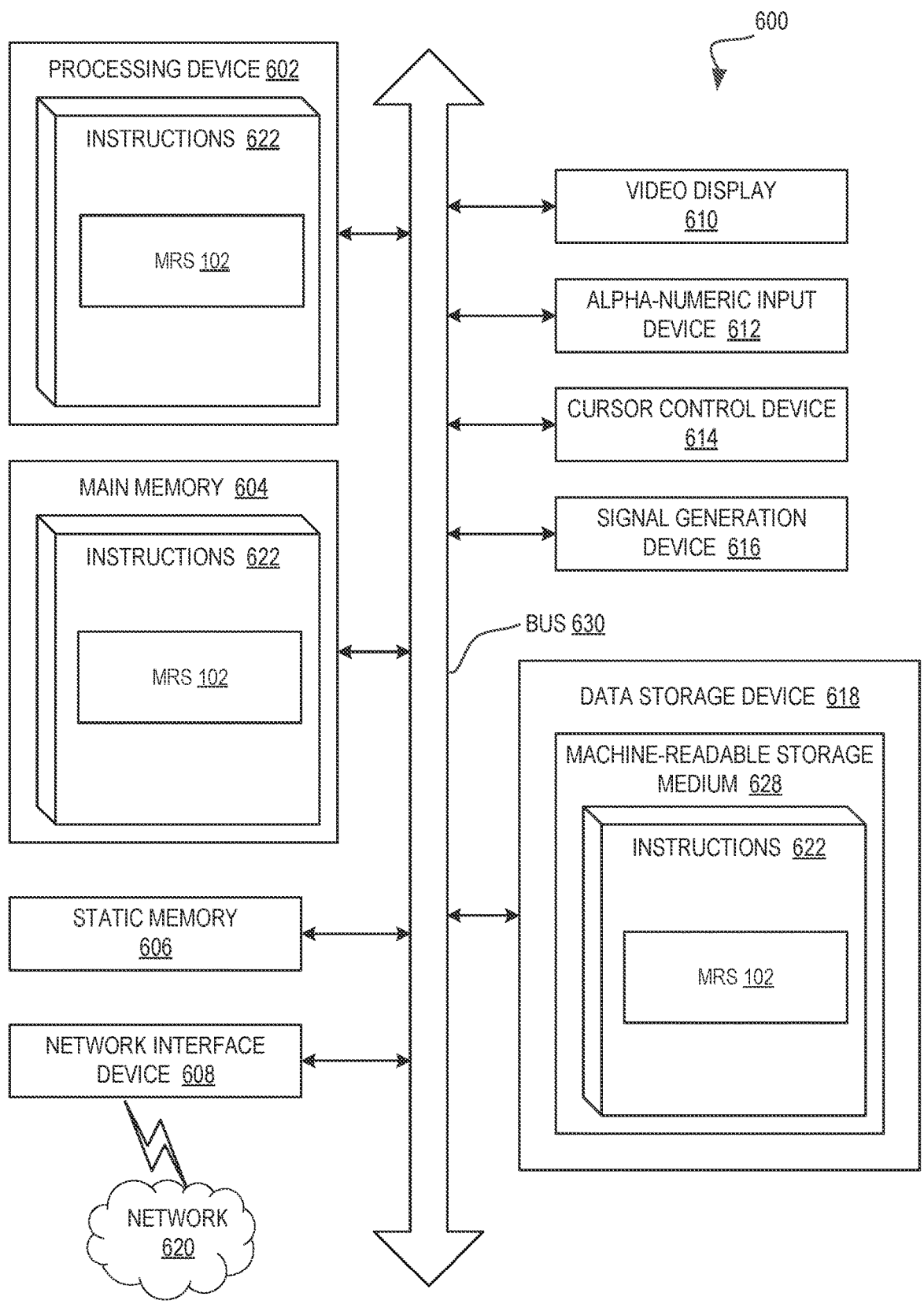
FIG. 6 depicts a block diagram of an illustrative computer system operating in accordance with one or more aspects of the present disclosure.

FIG. 6 is a diagrammatic representation of a machine in the exemplary form of a computer system 600 within which a set of instructions for causing the machine to perform any one or more of the methodologies discussed herein may be executed. In various illustrative examples, computer system 600 may correspond to administrative device 115 of FIG. 1 and/or computer system 500 of FIG. 5. Computer system 600 may be included within a data center that supports virtualization. Virtualization within a data center results in a physical system being virtualized using virtual machines (VM) to consolidate the data center infrastructure and increase operational efficiencies. A VM may be a program-based emulation of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain embodiments, computer system 600 may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. Computer system 600 may be provided by a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that device. Further, while only a single machine is illustrated, the term "computer" shall also be taken to include any collection of computers that individually or jointly execute a set (or multiple sets) of instructions to perform any one or more of the methodologies discussed herein.

The example computer system 600 may include a processing device 602, a main memory 604 (e.g., read-only memory (ROM), flash memory, dynamic random access memory (DRAM) (such as synchronous DRAM (SDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets. Processing device 602 may also be one or more special-purpose processing devices such as an application specific integrated circuit (ASIC), a field programmable gate array (FPGA), a digital signal processor (DSP), network processor, or the like. Processing device 602 may be configured to execute MRS 102 for programming the operations and steps discussed herein.

Computer system 600 may further include a network interface device 608. Computer system 600 may also include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

Data storage device 618 may include a machine-readable storage medium (or more specifically a computer-readable storage medium) 620 having one or more sets of instructions (e.g., MRS 102) embodying any one or more of the methodologies of functions described herein. The MRS 1102 may also reside, completely or at least partially, within main memory 604 and/or within processing device 602 during execution thereof by computer system 600; main memory 604 and processing device 602 also constituting machine-readable storage media. MRS 102 may further be transmitted or received over a network 626 via network interface device 608.

Machine-readable storage medium 620 may also be used to store the device queue manner logic persistently. While machine readable storage medium 620 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instruction for execution by the machine and that causes the machine to perform any one or more of the methodologies of the present disclosure. The term "machine-readable storage medium" shall accordingly be taken to include, but not limited to, solid-state memories, and optical and magnetic media.

Other computer system designs and configurations may also be suitable to implement the system and methods described herein. The following examples illustrate various implementations in accordance with one or more aspects of the present disclosure.

Example 1 is a method comprising: identifying, by a processing device, a value of a workload metric associated with a first zone of a mesh network; responsive to determining that the value of the workload metric satisfies a defined condition, identifying a first communication device in the first zone, wherein a first capacity of the first communication device satisfies a first capacity criterion, and wherein the first communication device is running a first service; identifying a second communication device in a second zone of the mesh network, wherein a second capacity of the second communication device satisfies a second capacity criterion; and starting the first service on the second communication device.

Example 2 is the method of example 1, wherein satisfying the capacity criterion indicates that the second communication device is underutilized.

Example 3 is the method of any examples 1-2, further comprising: identifying, in view of a pressure metric, the first zone of the mesh network.

Example 4 is the method of any examples 1-3, wherein the first zone of the mesh network is identified by: determining that the number of requests directed to communication devices within the first zone of the mesh network exceeds a threshold value.

Example 5 is the method of any examples 1-4, further comprising: suspending execution of a second service running on the second communication device.

Example 6 is the method of any examples 1-5, further comprising: associating the second communication device with the first zone of the mesh network.

Example 7 is the method of any examples 1-6, further comprising: identifying a third device in the second zone, wherein a third capacity of the third device satisfies the capacity criterion; and starting the second service on the third device.

Example 8 is the method of any examples 1-7, wherein identifying the value of the workload metric associated with the first communication device comprises: identifying at least one of a task queue capacity of the first communication device, a temperature of the first communication device, or a resource availability of the first communication device, wherein the resource availability comprises at least one of a random access memory (RAM) availability or a central processing unit (CPU) processing time availability.

Example 9 is the method of any examples 1-8, wherein determining that the value of the workload metric satisfies the defined condition comprises: determining that at least one of the task queue capacity, the temperature, or the resource availability exceeds a corresponding threshold.

Example 10 is the method of any examples 1-9, wherein identifying the second communication device in the second zone of the mesh network comprises: determining one or more resources available on the second communication device, wherein the one or more resources comprise at least one of random access memory (RAM) or central processing unit (CPU) processing time; and responsive to determining that the one or more resources available on the second communication device are below corresponding thresholds, determining that the capacity of the second communication device satisfies the capacity criterion.

Example 11 is the method of any examples 1-10, further comprising: responsive to an expiration of a defined period of time, determining that the value of the workload metric does not satisfy the defined condition; suspending execution of the first service on the second communication device; and resuming execution of a second service on the second communication device.

Example 12 is the method of any examples 1-11, further comprising: copying a current configuration of the first communication device; transmitting the current configuration to the second communication device; and causing the second communication device to operate in view of the current configuration.

Example 13 is a system comprising: a memory; and a processing device operatively coupled to the memory, the processing device to: identify a value of a workload metric associated with a first communication device in a first zone of a mesh network, wherein the first communication device is running a plurality of tasks; responsive to determining that the value of the workload metric satisfies a defined condition, identify a second communication device in a second zone of the mesh network, wherein a capacity of the second communication device satisfies a capacity criterion; add the second communication device to the first zone; and offload, to the second communication device, at least a subset of the plurality of tasks.

Example 14 is the system of example 13, wherein satisfying the capacity criterion indicates that the second communication device is underutilized.

Example 15 is the system of any examples 13-14, wherein the processing device is further to: identify, in view of a pressure metric, the first zone of the mesh network.

Example 16 is the system of any examples 13-15, wherein the first zone of the mesh network is identified by determining that the number of requests directed to the communication devices within the first zone of the mesh network exceeds a threshold value.

Example 17 is the system of any examples 13-16, wherein the processing device is further to: suspend execution of one or more services running on the second communication device.

Example 18 is the system of any examples 13-17, wherein the processing device is further to: responsive to determining that the second zone satisfies a second defined condition, identify a third communication device in a third zone, wherein a second capacity of the third communication device satisfies the capacity criterion; add the third communication device to the second zone; and offload, to the third communication device, at least a portion of requests directed to communication devices in the second zone.

Example 19 is the system of any examples 13-18, wherein to determine that the value of the workload metric satisfies the defined condition comprises: determining that at least one of a task queue capacity associated with the first communication device, a temperature associated with the first communication device, or a resource availability associated with the first communication device exceeds a corresponding threshold.

Example 20 is a non-transitory computer-readable media storing instructions that, when executed, cause a processing device to perform operations comprising: identifying a value of a workload metric associated with a first communication device in a first zone of a mesh network, wherein the first communication device is running a first service; responsive to determining that the value of the workload metric satisfies a defined condition, identifying a second communication device in a second zone of the mesh network, wherein a capacity of the second communication device satisfies a capacity criterion; and starting the first service on the second communication device.

Example 21 is the non-transitory computer-readable media of example 20, wherein satisfying the capacity criterion indicates that the second communication device is underutilized.

Example 22 is the non-transitory computer-readable media of any examples 20-21, further comprising: identifying, in view of a pressure metric, the first zone of the mesh network.

Example 23 is the non-transitory computer-readable media of any examples 20-22, wherein the first zone of the mesh network is identified by: determining that the number of requests directed to communication devices within the first zone of the mesh network exceeds a threshold value.

Example 24 is the non-transitory computer-readable media of any examples 20-23, further comprising: suspending execution of a second service running on the second communication device; and associating the second communication device with the first zone of the mesh network.

Example 25 is the non-transitory computer-readable media of any examples 20-24, further comprising: identifying a third device in the second zone, wherein a third capacity of the third device satisfies the capacity criterion; and starting the second service on the third device.

Example 26 is the non-transitory computer-readable media of any examples 20-25, wherein identifying the value of the workload metric associated with the first communication device comprises: identifying at least one of a task queue capacity of the first communication device, a temperature of the first communication device, or a resource availability of the first communication device, wherein the resource availability comprises at least one of a random access memory (RAM) availability or a central processing unit (CPU) processing time availability.

Example 27 is the non-transitory computer-readable media of any examples 20-26, wherein determining that the value of the workload metric satisfies the defined condition comprises: determining that at least one of the task queue capacity, the temperature, or the resource availability exceeds a corresponding threshold.

Example 28 is the non-transitory computer-readable media of any examples 20-27, wherein identifying the second communication device in the second zone of the mesh network comprises: determining one or more resources available on the second communication device, wherein the one or more resources comprise at least one of random access memory (RAM) or central processing unit (CPU) processing time; and responsive to determining that the one or more resources available on the second communication device are below corresponding thresholds, determining that the capacity of the second communication device satisfies the capacity criterion.

Example 29 is the non-transitory computer-readable media of any examples 20-28, further comprising: responsive to an expiration of a defined period of time, determining that the value of the workload metric does not satisfy the defined condition; suspending execution of the first service on the second communication device; and resuming execution of a second service on the second communication device.

Example 30 is the non-transitory computer-readable media of any examples 20-29, further comprising: copying a current configuration of the first communication device; transmitting the current configuration to the second communication device; and causing the second communication device to operate in view of the current configuration.

Example 31 is an apparatus comprising: a processing device; means for identifying, by a processing device, a value of a workload metric associated with a first zone of a mesh network; means for, responsive to determining that the value of the workload metric satisfies a defined condition, identifying a first communication device in the first zone, wherein a first capacity of the first communication device satisfies a first capacity criterion, and wherein the first communication device is running a first service; means for identifying a second communication device in a second zone of the mesh network, wherein a second capacity of the second communication device satisfies a second capacity criterion; and means for starting the first service on the second communication device.

Example 32 is the apparatus of example 31, wherein the first zone of the mesh network is identified by determining that the number of requests directed to communication devices within the first zone exceeds a threshold value.

Example 33 is the apparatus of any examples 31-32, further comprising: means for identifying, in view of a pressure metric, the first zone of the mesh network.

Example 34 is the apparatus of any examples 31-33, further comprising means for suspending execution of a second service running on the second communication device; means for identifying a third device in the second zone, wherein a third capacity of the third device satisfies the capacity criterion; and means for starting the second service on the third device.

Example 35 is the apparatus of any examples 31-34, wherein identifying the value of the workload metric associated with the first communication device comprises means for identifying at least one of a task queue capacity of the first communication device, a temperature of the first communication device, or a resource availability of the first communication device, wherein the resource availability comprises at least one of a random access memory (RAM) availability or a central processing unit (CPU) processing time availability.

Example 36 is a method comprising: receiving a value of a number of client devices in communication with one or more communication devices in a first zone of a mesh network; responsive to determining that the value of the number exceeds a threshold value, identifying a value of a workload metric for at least one of the one or more communication devices in the first zone; identifying a first communication device of the one or more communication devices, wherein a first value of the workload metric for the first communication satisfies a threshold condition; identifying a second communication device in a second zone of the mesh network, wherein a capacity of the second communication device satisfies a capacity criterion; and adding the second communication device to the first zone.

Example 37 is the method of example 36, wherein the first communication device is running a first service, and wherein the second communication device is running a second service, and further comprising: suspending execution the second service the second communication device; starting execution of the first service on the second communication device; and associating the second communication device with the first zone in the mesh network.

Example 38 is the method of any examples 36-37, wherein a workload metric for at least one of the one or more communication devices in the first zone comprises: identifying at least one of a task queue capacity of at least one of the one or more communication devices, a temperature of at least one of the one or more communication devices, or a resource availability of at least one of the one or more communication devices, wherein the resource availability comprises at least one of a random access memory (RAM) availability or a central processing unit (CPU) processing time availability.

Example 39 is the method of any examples 36-38, wherein identifying the first communication device of the one or more communication devices comprises: determining that at least one of the task queue capacity, the temperature, or the resource availability exceeds a corresponding threshold.

Example 40 is the method of any examples 36-39, wherein identifying the second communication device in the second zone of the mesh network comprises: determining one or more resources available on the second communication device, wherein the one or more resources comprise at least one of random access memory (RAM) or central processing unit (CPU) processing time; and responsive to determining that the one or more resources available on the second communication device are below corresponding thresholds, determining that the capacity of the second communication device satisfies the capacity criterion.

Example 41 is the method of any examples 36-40, further comprising: responsive to an expiration of a defined period of time, determining that the value of the workload metric does not satisfy the defined condition; suspending execution of the first service on the second communication device; and resuming execution of a second service on the second communication device.

Example 42 is the method of any examples 36-41, further comprising: identifying a reconfigure indicator associated with the second communication device, wherein the reconfigure indicator indicates whether the second communication device may be reconfigured.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Some portions of the detailed descriptions are presented in terms of methods and symbolic representations of operations on data bits within a computer memory. These descriptions and representations are the means used by those skilled in the data processing arts to most effectively convey the substance of their work to others skilled in the art. A method is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling," "transmitting," "requesting," "identifying," "querying," "retrieving," "forwarding," "determining," "passing," "processing," "issuing," "measuring," "caching," "monitoring," mapping," "estimating," "calculating," "disabling," "detecting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), erasable programmable ROMs (EPROMs), electrically erasable programmable ROMs (EEPROMs), magnetic or optical cards, flash memory devices including universal serial bus (USB) storage devices (e.g., USB key drives) or any type of media suitable for storing electronic instructions, each of which may be coupled to a computer system bus.

The methods and illustrative examples described herein are not inherently related to any particular computer or other apparatus. Various general purpose systems may be used with programs in accordance with the teachings herein or it may prove convenient to construct more specialized apparatus to perform the required method 300, and/or each of their individual functions, routines, subroutines or operations. Examples of the structure for a variety of these systems are set forth in the description above.

It is to be understood that the above description is intended to be illustrative, and not restrictive. Many other embodiments will be apparent to those of skill in the art upon reading and understanding the above description. Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
identifying, by a processing device, a value of a workload metric associated with a first communication device in a first zone of a mesh network, wherein the first communication device is running a first service;
responsive to determining that the value of the workload metric satisfies a defined condition, identifying a second communication device in a second zone of the mesh network, wherein a capacity of the second communication device satisfies a capacity criterion; and
starting the first service on the second communication device.

2. The method of claim 1, further comprising:
identifying, in view of a pressure metric, the first zone of the mesh network.

3. The method of claim 1, wherein the first zone of the mesh network is identified by determining that a number of requests directed to communication devices within the first zone of the mesh network exceeds a threshold value.

4. The method of claim 1, further comprising:
suspending execution of a second service running on the second communication device.

5. The method of claim 4, further comprising:
identifying a third device in the second zone, wherein a third capacity of the third device satisfies the capacity criterion; and
starting the second service on the third device.

6. The method of claim 1, further comprising:
associating the second communication device with the first zone of the mesh network.

7. The method of claim 1, wherein identifying the value of the workload metric associated with the first communication device comprises: identifying at least one of a task queue capacity of the first communication device, a temperature of the first communication device, or a resource availability of the first communication device, wherein the resource availability comprises at least one of a random access memory (RAM) availability or a central processing unit (CPU) processing time availability.

8. The method of claim 7, wherein determining that the value of the workload metric satisfies the defined condition comprises:
determining that at least one of the task queue capacity, the temperature, or the resource availability exceeds a corresponding threshold.

9. The method of claim 1, wherein identifying the second communication device in the second zone of the mesh network comprises:
determining one or more resources available on the second communication device, wherein the one or more resources comprise at least one of random access memory (RAM) or central processing unit (CPU) processing time; and
responsive to determining that the one or more resources available on the second communication device are below corresponding thresholds, determining that the capacity of the second communication device satisfies the capacity criterion.

10. The method of claim 1, further comprising:
responsive to an expiration of a defined period of time, determining that the value of the workload metric does not satisfy the defined condition;
suspending execution of the first service on the second communication device; and
resuming execution of the first service on the second communication device.

11. The method of claim 1, further comprising:
copying a current configuration of the first communication device;
transmitting the current configuration to the second communication device; and
causing the second communication device to operate in view of the current configuration.

12. A non-transitory computer-readable media storing instructions that, when executed, cause a processing device to perform operations comprising:
identifying a value of a workload metric associated with a first communication device in a first zone of a mesh network, wherein the first communication device is running a first service;
responsive to determining that the value of the workload metric satisfies a defined condition, identifying a second communication device in a second zone of the mesh network, wherein a capacity of the second communication device satisfies a capacity criterion; and
starting the first service on the second communication device.

13. The non-transitory computer-readable media of claim 12, further comprising:
identifying, in view of a pressure metric, the first zone of the mesh network.

14. The non-transitory computer-readable media of claim 12, further comprising:
suspending execution of a second service running on the second communication device;
identifying a third device in the second zone, wherein a third capacity of the third device satisfies the capacity criterion;
starting the second service on the third device; and
associating the second communication device with the first zone of the mesh network.

15. A system comprising:
a memory; and
a processing device operatively coupled to the memory, the processing device to:
identify a value of a workload metric associated with a first communication device in a first zone of a mesh network, wherein the first communication device is running a first service;
responsive to a determination that the value of the workload metric satisfies a defined condition, identify a second communication device in a second zone of the mesh network, wherein a capacity of the second communication device satisfies a capacity criterion; and
start the first service on the second communication device.

16. The system of claim 15, wherein the processing device is further to:
identify, in view of a pressure metric, the first zone of the mesh network.

17. The system of claim 15, wherein to identify the first zone of the mesh network, the processing device is to determine that a number of requests directed to communication devices within the first zone of the mesh network exceeds a threshold value.

18. The system of claim 15, wherein the processing device is further to:
suspend execution of a second service running on the second communication device.

19. The system of claim 18, wherein the processing device is further to:
- identify a third device in the second zone, wherein a third capacity of the third device satisfies the capacity criterion; and
- start the second service on the third device.

20. The system of claim 15, wherein the processing device is further to:
- associate the second communication device with the first zone of the mesh network.

* * * * *